United States Patent [19]

Morgan, Jr.

[11] Patent Number: 4,706,610
[45] Date of Patent: Nov. 17, 1987

[54] LIVESTOCK DATA INDICATOR

[76] Inventor: Charles Morgan, Jr., P.O. Box 837, College Grove, Tenn. 37046

[21] Appl. No.: 824,461

[22] Filed: Jan. 31, 1986

Related U.S. Application Data

[63] Continuation-in-part of Ser. No. 661,139, Oct. 15, 1984, Pat. No. 4,574,742.

[51] Int. Cl.$^4$ .............................................. G09F 3/00
[52] U.S. Cl. ...................................... 119/156; 40/300
[58] Field of Search ................. 40/1.5, 300, 301, 302, 40/303, 908; 119/156

[56] References Cited

U.S. PATENT DOCUMENTS

| | | | |
|---|---|---|---|
| 1,957,023 | 5/1934 | Hutnikow | 40/302 X |
| 3,900,981 | 8/1975 | Nichols | 40/300 |
| 3,949,708 | 4/1976 | Meeks | 40/301 X |
| 4,023,532 | 5/1977 | Goodwin | 119/156 |
| 4,198,772 | 4/1980 | Furutu | 40/302 |
| 4,428,327 | 1/1984 | Steckel | 119/156 |

FOREIGN PATENT DOCUMENTS 456426 8/1913 France .................. 40/300

Primary Examiner—Robert P. Swiatek
Attorney, Agent, or Firm—A. Hatcher; E. Strickland

[57] ABSTRACT

A livestock data indicator is made up of two parallel plastic members adapted to be folded together by plastic hinges disposed between and joining the two members, the plastic members being held together by studs on one of the members which fit into corresponding holes in the other so as to secure hairs, for example of the mane of a horse or the tail of a cow, therebetween and not be brushed off the animal on which used by switching of the tail against a fence or other obstructive object or rubbing the mane against a gate or the like. For additional security the inside of each of the two members, that is, the sides or surfaces which are folded and attached together, preferably have rows of teeth thereon which aid in holding or locking the hairs in place when the two members are snapped together. One of the parallel members, preferably a larger of the two having more data space on its visible surface when folded or hinged to the other, has a rectangular-like or extended cube-resembling compartment protruding therefrom on its outside or data-bearing surface adapted to contain an absorbent material treated with insecticide for continued application such as by switching of the tail.

3 Claims, 23 Drawing Figures

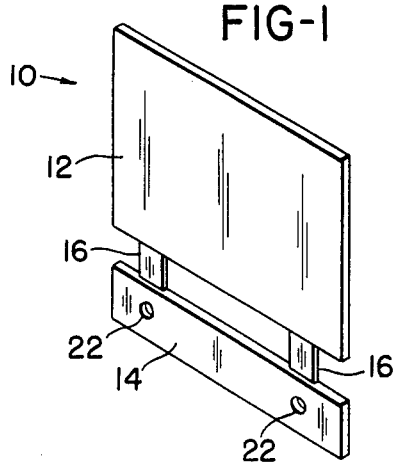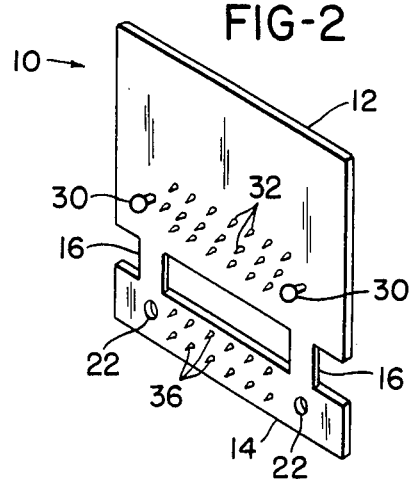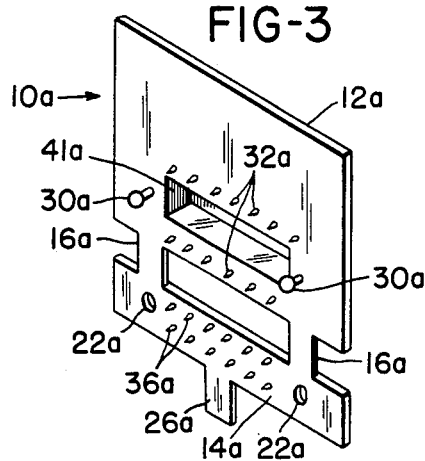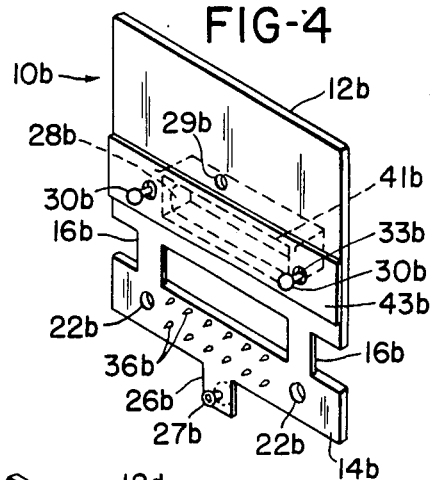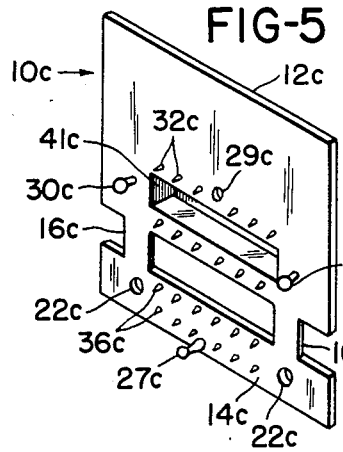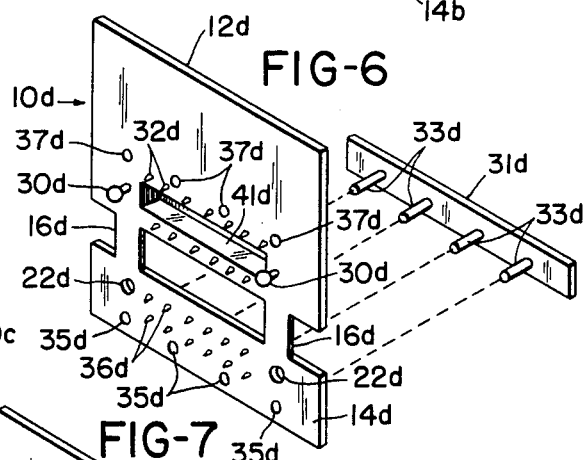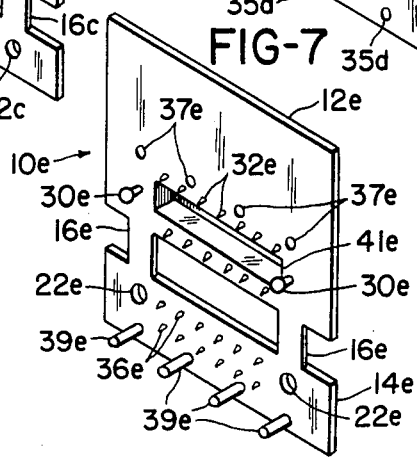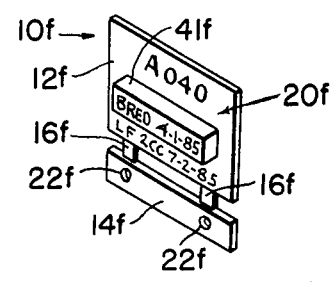

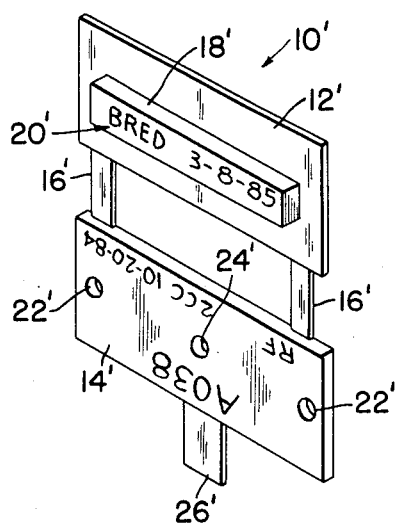
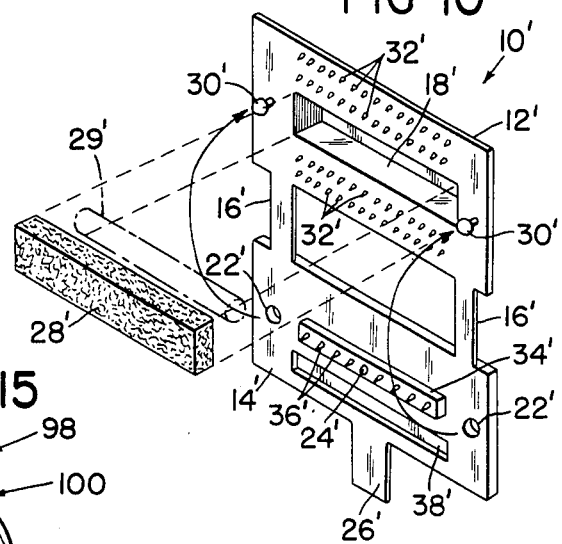
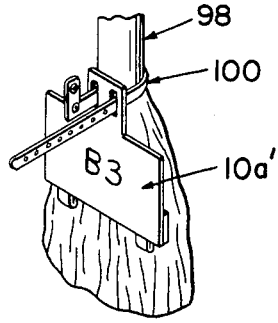
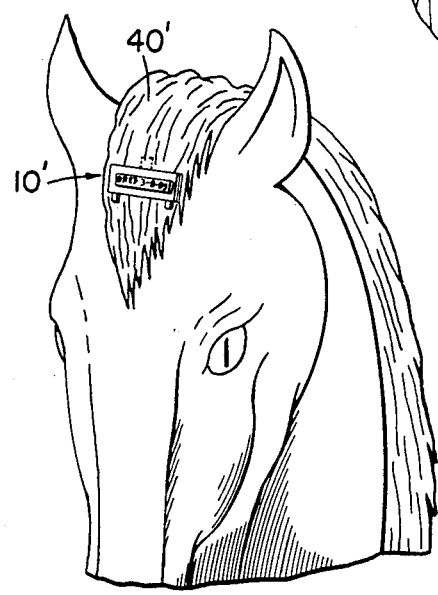
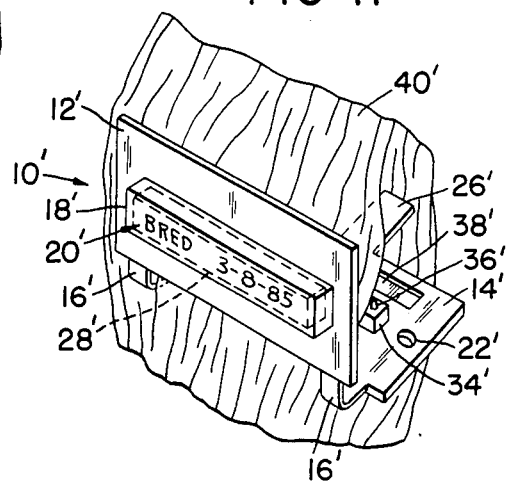
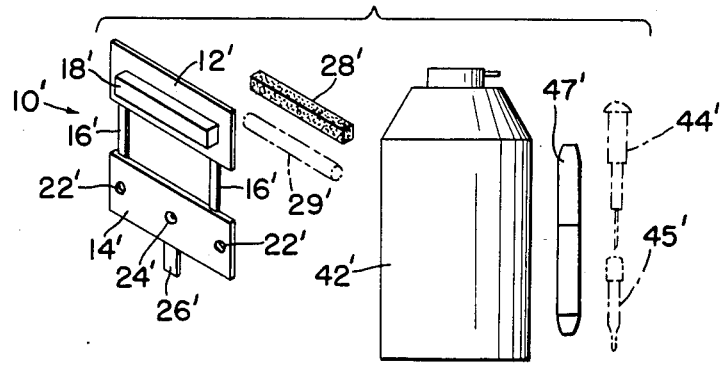
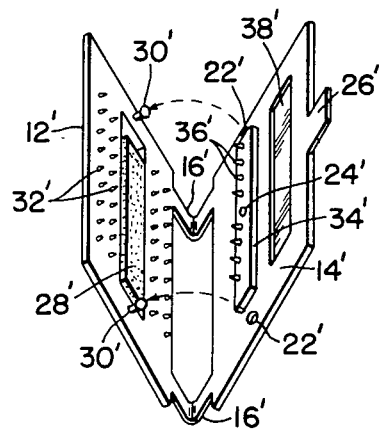

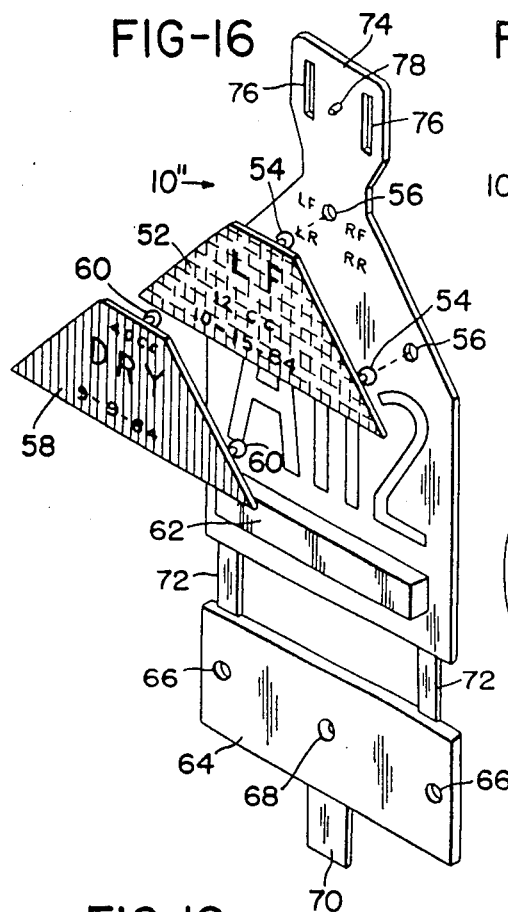
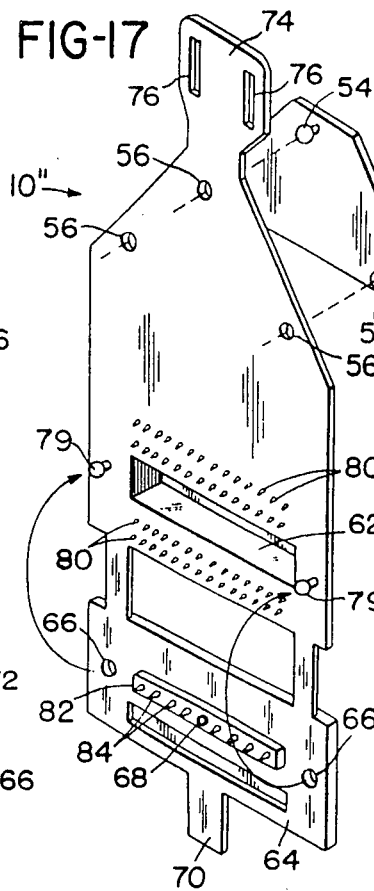
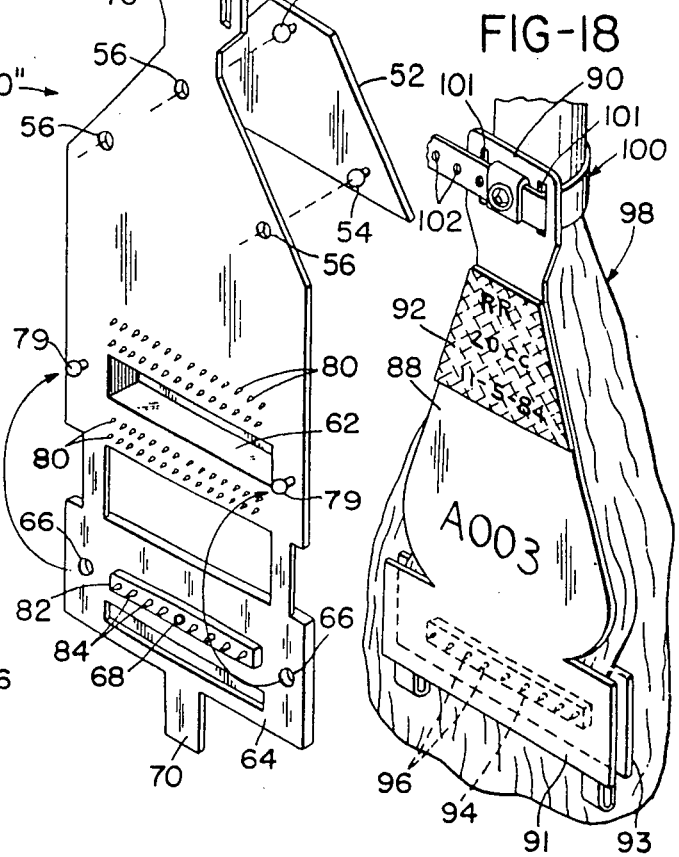
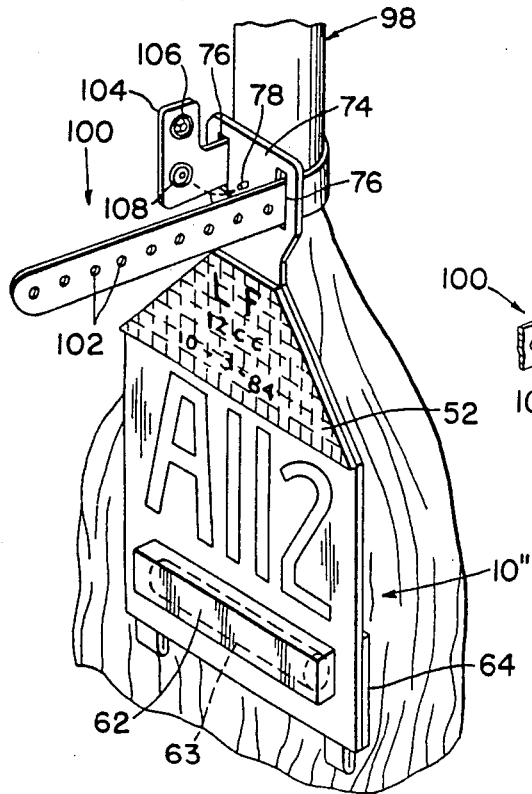
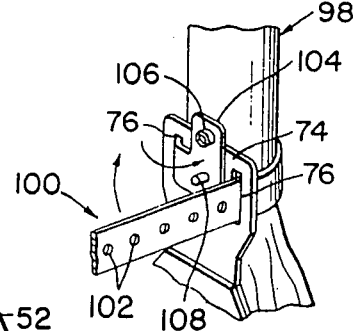
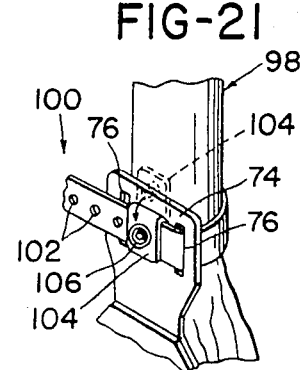
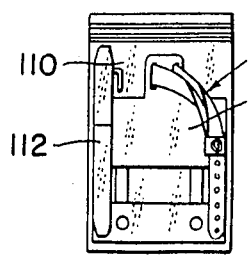
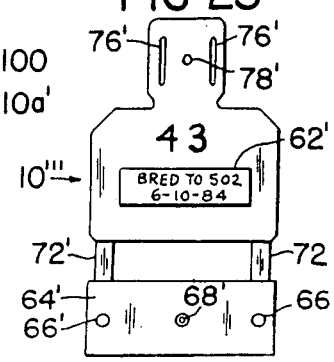

4,706,610

LIVESTOCK DATA INDICATOR

BACKGROUND OF THE INVENTION

This is a continuation-in-part of Ser. No. 661,139 filed Oct. 15, 1984, now U.S. Pat. No. 4,574,742.

FIELD OF THE INVENTION

This invention relates to a livestock data indicator. More particularly, it relates to cow or horse or like animal identification means which may also be used to apply insecticide or like treating agent to livestock.

DESCRIPTION OF THE PRIOR ART

Presently available cow tags or data indicators are often lost by tail switching or brushing against obstructive objects in a heavily weeded or forested area even when they have two fasteners.

SUMMARY OF THE INVENTION

After extended investigation I have developed a data indiator having only one fastener or fastening means which may serve also as an insecticide applicator. My data indicator in its broadest aspects involves a plastic hinged member having opposing faces or parallel members adapted to be hinged together. One of the opposing faces or parallel members, preferably a larger one with more space for identification marking thereon, has studs on one surface or side thereof adapted to fit into corresponding holes on the same side or face of the second parallel member when the members are folded and locked together via narrow strips or hinges between them which join them together. In a preferred embodiment of the invention in which I enable the data tag to also be used as an insecticide applicator I include a boxlike compartment, preferably protruding from the outside surface of the larger parallel member, that is, the side or surface opposite the one having the studs thereon. In the compartment is placed an absorbent material which may be treated with insecticide or an easily breakable ampule of insecticide or wicklike material saturated with insecticide. Rows of teeth may be placed along the inside surface of both members to enable the members to fit snugly onto the hairs of the tail or mane and grip them tighter. A barlike protuberance on the inside of one of the parallel members may be used with teeth along its length to fit into the compartment of the other member when the parallel members are folded and locked together.

According to another embodiment of my invention, second fastening means or a second fastener comprising a belt or band adapted to fit through slits in a narrower portion of the larger member may be a part of the data indicator. It may be of the male and female snap type.

In a further embodiment of the invention the data indicator or livestock tag may be a part of a kit or package which also includes separately one or more of the following, specifically, an ampule or piece of absorbent material, a marker for adding data when not printed on the surface of the indicator, a syringe or eye dropper for adding insecticide or the like to the absorbent material and a container or aerosol can containing insecticide.

According to a still further embodiment of the invention, when the tag or data indicator has the second or belt or band fastener and slits in it for use of same as a part thereof, it may also have a colored sticker or like with data either already printed thereon or blank for data such as infected quarter of a dairy cow, number of cubic centimeters of antibiotic used in treating a cow with mastitis, the date turned dry or date treated or the like. The sticker, label or marker is shaped to fit the shape of the portion of the data indicator to which it is adhered, and is color coded to indicate whether the cow is fresh or dry, for example, red for fresh and yellow for dry. dr

BRIEF DESCRIPTION OF THE DRAWINGS

For a better understanding of my invention reference will now be made to the drawings which form a part hereof and represent preferred embodiments of the invention.

In the drawing,

FIG. 1 is a perspective view of the data indicator of the invention in its simplest form from the front or outside before folding the two members thereof together.

FIG. 2 is a similar view to FIG. 1 except from the inside and showing teeth which help the data indicator to fit more tightly.

FIG. 3 is a perspective view from the inside showing an embodiment of the invention according to which the data indicator has an insecticide compartment.

FIG. 4 shows the data indicator of the invention similar to to that of FIG. 3 except for having an additional centrally aligned stud or screw head and hole.

FIG. 5 is a view similar to that of FIG. 3 but showing also a centrally aligned stud or screw head and hole such as that of FIG. 4.

FIG. 6 depicts an embodiment of the invention in which a holding bar has teeth or similar projections therefrom which go through corresponding holes in the upper and lower members of the data indicator or tag when they are folded together so as to fasten on a tail or mane or the like.

FIG. 7 shows an arrangement of bars projecting from the lower member of the indicator and upper member holes therefor.

FIG. 8 depicts a representative data indicator of the invention with data on both the regular surface thereof and the outside surface of the insecticide compartment on the outside of its upper member.

FIG. 9 is a perspective view of a data indicator according to the invention from the front or outside before folding members of substantially the same size together and having data both on the tag surface and the compartment surface on the member adapted to fold against a member having a center tab for aid in snapping the members together.

FIG. 10 depicts a data indicator according to the invention together with either an ampule or a piece of absorbent material adapted to fit in a compartment therein as shown by dotted lines.

FIG. 11 shows how a data indicator such as that of the invention snaps together around the hairs of a horse's mane or a cow's tail or the like.

FIG. 12 depicts a portion of the head of a horse with a data indicator of the invention snapped on the forehead or front portion of the mane.

FIG. 13 shows the data indicator in a semi-open or semi-closed position.

FIG. 14 includes the data indicator as a part of a kit according to the invention.

FIG. 15 is an illustration of use of a data indicator according to the invention fastened to a tail by means of a band, strap or belt or the like which may be a part thereof.

FIG. 16 depicts a data indicator according to the invention having marked labels or stickers to adhere thereto.

FIG. 17 shows a data indicator such as that of FIG. 16 as seen from the inside or back.

FIG. 18 is a perspective view of a data indicator according to the invention with the strap or band or belt of one embodiment helping to hold it on a tail.

FIG. 19 depicts a data indicator with the two parallel members thereof in snapped-together position on a tail and with the strap or band or belt lock or snap in a position ready to be closed or locked.

FIG. 20 is a cut-away view showing the strap lock in a partially closed or snapped-together position.

FIG. 21 is a similar cut-away view with the lock entirely closed.

FIG. 22 depicts another embodiment of a kit or package according to the invention containing the data indicator with a marker for applying data thereto.

FIG. 23 represents an embodiment of the data indicator of the invention having a hole in one of the parallel members adapted to receive the pointed end of a stud or screw on the other member therein when the members are hinged together via the substantially parallel hinges, which are preferably at or near the edges of the parallel members.

DETAILED DESCRIPTION OF THE INVENTION

In the drawing, data indicator 10 comprises basically parallel members 12 and 14 hinged together by hinges 16 and having holes 22 in one member aligned with studs or the like 30 on the other, and, in one embodiment of the invention having teeth 32 and 36 on members 12 and 14, which, along with many of the remaining parts referred to in this description have corresponding parts in other embodiments indicated by the letters a through f and by primes and double primes or the like.

Data indicator 10 may have a compartment 41, 18, 61 in one of its parallel members 12 and 14 (and in 43 in FIG. 23) for insertion therein of absorbent material or the like 28' or ampule or capsule or the like 29' (FIG. 10) containing or adapted to contain insecticide such as may be found or used in or from a container 42', a syringe 44' or an eye dropper or the like 45' (all shown in FIG. 14). According to one embodiment of the invention, screw or stud 27b, 27c, 68', which may be on a tab or extension 26', 26a, 26b of one member or elsewhere on one of the inside surfaces of the data indicator or tag 10, is adapted to be screwed into or fit into a corresponding hole 29b, 29c, 24', 78' of the other member. Bar 31d, studs 33d, of FIG. 6 and other studs 39e (FIG. 7), are adapted to fit through holes such as 35d, 37d of FIG. 6, and such as 37e of FIG. 7.

According to another embodiment of the invention one of the parallel members may be extended to be large enough to have slits 76 (and 101 in FIG. 18) at upper extension 74 (and 90 in FIG. 18) through which band or belt or the like 100 fits and goes around tail 98 to be held therearound by means of slit or spring-type tab 108 fitting into eyelet 106 on extension 104 or the reverse and fastener 78 fitting through an appropriate hole 102 provided in belt 100. Labels or stickers 52, 58, 92 (FIGS. 16 and 18) may also be employed according to the invention. In such embodiment the hinges between the parallel members are indicated at 72 (FIG. 16), and additional teeth 84 are shown on bar 82. Comparable studs 79 are aligned with holes 66 in FIG. 17. Parallel members 91 and 93 include a bar 94 with teeth 96, and member 64 has a bar 82 with teeth 84 and a center hole 68. Parallel members 12', 14' of FIG. 13 include a bar 34' with teeth 36' and center hole 24'. In FIG. 16, upper extension or tab 74 has a stud 78 between slots or slits 76. In FIGS. 18 through 21 livestock tail is indicated at 98 and in FIGS. 16 and 17 a lower tab or extension at 70. Kit 110 of FIG. 22 contains a data indicator 10a with strap or belt 100 and a marker 112. In FIG. 19 compartment 62 of data indicator 10" contains an ampule or capsule of insecticide 63. In FIG. 16 labels or stickers 52 and 58 fit onto data indicator 10" via studs 54, 60 and holes 56, also shown in FIG. 17, which additionally includes teeth 80. In FIG. 18 label or sticker 92 fits on the upper part of portion 88 of the data indicator. In FIG. 5 stud or screw 27c and hole 29c may be reversed, that is, 27c may be a hole and 29c a stud or screw. Also, there may be a raised bar portion of member 14c.

While the invention has been described in terms of preferred embodiments, the claims appended hereto are intended to encompass all embodiments which fall within the spirit of the invention.

Having thus described my invention and certain preferred embodiments thereof, I claim:

1. A livestock data indicator comprising two plastic members joined by at least two plastic hinges located adjacent the edges of the members and adapted to be folded and fastened together, one of said members having at least two studs thereon and the other having at least two holes into which said studs fit when said members are folded and fastened together, with said studs being substantially in line with the hinges, and said holes being substantially in line with the hinges on the member that does not have said in-line studs, a substantially centrally positioned stud on one of said members, and a centrally positioned hole substantially in-line with said centrally positioned stud on the member which has said in-line studs thereon.

2. A livestock data indicator comprising two plastic members joined by plastic hinges and adapted to be folded and fastened together, one of said members having studs thereon and the other having holes in to which said studs fit when said members are folded and fastened together, a boxlike compartment located on an outer side of one of said members and away from an inner stud-containing surface, said compartment being adapted to hold insecticide when said plastic members are folded and fastened together, rows of teeth provided on said stud-containing surface, and an additional stud and an additional hole substantially centrally positioned and in line with one another, said stud being on one of said members and said hole being on the other.

3. The livestock data indicator of claim 2 wherein said additional stud comprises a screw adapted to fit into said additional hole when said two plastic members are folded and fastened together.

* * * * *